United States Patent
Ju et al.

(10) Patent No.: US 7,636,657 B2
(45) Date of Patent: Dec. 22, 2009

(54) METHOD AND APPARATUS FOR AUTOMATIC GRAMMAR GENERATION FROM DATA ENTRIES

(75) Inventors: Yun-Cheng Ju, Bellevue, WA (US); David G. Ollason, Seattle, WA (US); Siddharth Bhatia, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 208 days.

(21) Appl. No.: 11/007,880

(22) Filed: Dec. 9, 2004

(65) Prior Publication Data

US 2006/0129396 A1 Jun. 15, 2006

(51) Int. Cl.
*G06F 17/21* (2006.01)
(52) U.S. Cl. ........................................ 704/10
(58) Field of Classification Search .............. 704/10, 704/257, 9; 706/45; 707/3, 101, 102; 714/25
See application file for complete search history.

(56) References Cited

U.S. PATENT DOCUMENTS

| | | | |
|---|---|---|---|
| 6,415,283 B1 * | 7/2002 | Conklin | 707/3 |
| 7,289,956 B2 * | 10/2007 | Yu et al. | 704/240 |
| 7,315,868 B1 * | 1/2008 | Turba | 707/104.1 |
| 2002/0042707 A1 * | 4/2002 | Zhao et al. | 704/9 |
| 2002/0052743 A1 * | 5/2002 | Schmid et al. | 704/257 |
| 2003/0223556 A1 * | 12/2003 | Ju et al. | 379/93.24 |
| 2004/0107088 A1 * | 6/2004 | Budzinski | 704/10 |
| 2004/0133590 A1 * | 7/2004 | Henderson et al. | 707/102 |
| 2005/0050391 A1 * | 3/2005 | Grieskamp et al. | 714/25 |
| 2005/0125220 A1 * | 6/2005 | Kim | 704/10 |

OTHER PUBLICATIONS

W3C, Natural Language Semantics Markup Language for the Speech Interface Framework, Nov. 2000. http://web.archive.org/web/20010123235800/http://www.w3.org/TR/nl-spec/.*

* cited by examiner

*Primary Examiner*—David R Hudspeth
*Assistant Examiner*—Jakieda R Jackson
(74) *Attorney, Agent, or Firm*—John D. Veldhuis-Kroeze; Westman, Champlin & Kelly, P.A.

(57) ABSTRACT

A method of generating an optimized grammar, for use in speech recognition, from a data set or big list of items, is disclosed. The method includes the steps of obtaining a tree representing items in the data set, and generating the grammar using the tree. The tree or tree data structure representing items in the data set is a simulated recognition search tree, representing items in the data set, which can be automatically generated from the data set.

16 Claims, 8 Drawing Sheets

```
<grammar xml:lang="en-US" version="1.0" tag-format="semantics-ms/1.0" xmlns="http://www.w3.org/2001/06/grammar"
  xmlns:sapi="http://schemas.microsoft.com/Speech/2002/06/SRGSExtensions" root="topLevel">
<rule id="topLevel" scope="public">
  <one-of>
    <item weight="3">
      Michael
      <one-of>
        <item weight="1">Anderson</item>
        <item />
        <item weight="1"> Smith <tag>$._value = "Dr. Smith";</tag> </item>
      </one-of>
    </item>
    <item weight="1">David Ollason</item>
  </one-of>
  <tag>if ($._attributes == undefined)
   { $._attributes = {};
     $._value = $recognized.text; };
     $._attributes.text = $recognized.text;
  </tag>
</rule>
</grammar>
```

FIG. 4

METHOD AND APPARATUS FOR AUTOMATIC GRAMMAR GENERATION FROM DATA ENTRIES

BACKGROUND OF THE INVENTION

The present invention generally pertains to speech recognition applications and systems. More specifically, the present invention pertains to methods and apparatus for automatically generating grammars for use by speech recognition applications.

Speech recognition applications often need to deal with big lists of proper names, symbols, numbers, ids, or other items. As an example, speech recognition is being increasingly used to recognize names spoken by a user or caller. For instance, voice dialing and other systems, a caller or user is typically asked to speak the name of the person who is to be contacted, or identified for some purpose. The system then uses a speech recognition engine to recognize the spoken name from a large list of names, often in combination with prompting for the caller or user to navigate through any name collisions or other difficulties in the identification process. Speech recognition of spoken names is also used for many purposes other than voice dialing systems.

One of the biggest challenges to using speech recognition to recognize names or other items relates to the process of building context free grammars (CFGs) to be used by the speech recognition engine. This is particularly true if the items to be recognized are from a large data list. In some speech recognition systems or applications, the number of items on the data list increases frequently, sometimes even daily, by significant numbers. In certain applications, it is possible for the number of items on the data list to increase by tens of thousands of items every day. Creating or updating CFGs to deal with these large and sometimes fast growing data lists can be very challenging, time consuming and cumbersome. In short, a challenge faced by many in speech recognition applications is to correctly and timely generate efficient grammars from those big lists.

A number of factors which affect speech recognition engine performance need to be considered when generating the CFG to be used by the speech recognition engine during the speech recognition process. To increase the ability of a speech recognition engine to accurately identify a spoken name or item, prefixing of the CFG is useful. For example, with a prefixed CFG, instead of the speech recognition engine having to process the competing common phrase "David", the grammar recognizes "David" as a shared speech unit. The grammar then branches to possible next speech units "Ollason" and "Smith" for continued speech recognition. In other words, prefixing of a CFG allows the speech recognition engine to reduce the resource consumption, which typically improves accuracy of the recognition process. Other factors which must be considered when generating a CFG include weighting of branches of the tree structure represented in the CFG, dealing with name collisions (names sharing identical spellings or pronunciations), optimizing the size (storage and processing requirements) of the CFG, etc.

Due to the size of the task of creating or updating grammars for large lists, it is important to do so as efficiently as possible. However, accuracy is also very important. Any techniques for speeding up the grammar generation or updating process which result in a lower quality grammar will render the speech recognition system, using the CFG, less accurate. This in turn will increase the time required for users of the system to achieve a desired result, for example of being connected to a particular individual in a voice-dialing system. Many users will find the decreased accuracy and increased time required to be unacceptable.

The present invention provides solutions to one or more of the above-described problems and/or provides other advantages over the prior art.

SUMMARY OF THE INVENTION

A method of generating a grammar, for use in speech recognition, from a data set or big list of items, is disclosed. The method includes the steps of obtaining a tree representing items in the data set, and generating the grammar using the tree. The tree or tree data structure representing items in the data set is a simulated recognition search tree, representing items in the data set, which can be automatically generated from the data set.

In some specific embodiments, the present invention automatically analyzes the data set, annotates custom pronunciations, prefixes the grammar, correctly assigns language model weights (CFG phrase branching probabilities), text normalizes names (for the case of spelling grammars), performs Semantic Markup Language (SML) tag optimization, produces the grammars themselves, and raises warnings of potential inconsistencies, all using the simulated recognition search tree. In more general embodiments, the present invention performs some, but not all, of these functions.

Other features and benefits that characterize embodiments of the present invention will be apparent upon reading the following detailed description and review of the associated drawings.

BRIEF DESCRIPTION OF THE DRAWINGS

FIGS. 3-1 through 3-4 are diagrammatic illustrations of the process of generating a simulated recognition search tree.

FIG. 4 is an illustration of a context free grammar (CFG) generated using the simulated recognition search tree shown in FIGS. 3-1 through 3-4.

DETAILED DESCRIPTION OF ILLUSTRATIVE EMBODIMENTS

I. Exemplary Environments

Various aspects of the present invention pertain to methods and apparatus for automatic grammar generation from data entries. For example, a context free grammar (CFG) generated using the methods and apparatus of the present invention is used by a speech recognition engine for performing speech recognition in a desired environment. The data entries from which the CFG is automatically generated are typically in the form of a list, and the present invention is particularly useful when the list of data entries is large and/or frequently changing or quickly growing. However, the present invention is not limited to use with lists having these characteristics.

Examples of well-known computing systems, environments, and/or configurations that may be suitable for use with the invention include, but are not in any way limited to, personal computers, server computers, hand-held or laptop devices, multiprocessor systems, microprocessor-based systems, and set top boxes. Embodiments of the present invention can be implemented in a wide variety of speech recognition applications, for example including voice-dialing systems, call routing systems, voice messaging systems, order management systems, or any application where a speech recognition engine uses a grammar to recognize speech from a user. These are simply examples of systems within which embodiments of the present invention can be implemented.

Prior to discussing embodiments of the present invention in detail, exemplary computing environments within which the embodiments and their associated systems can be implemented will be discussed.

Figure 1:
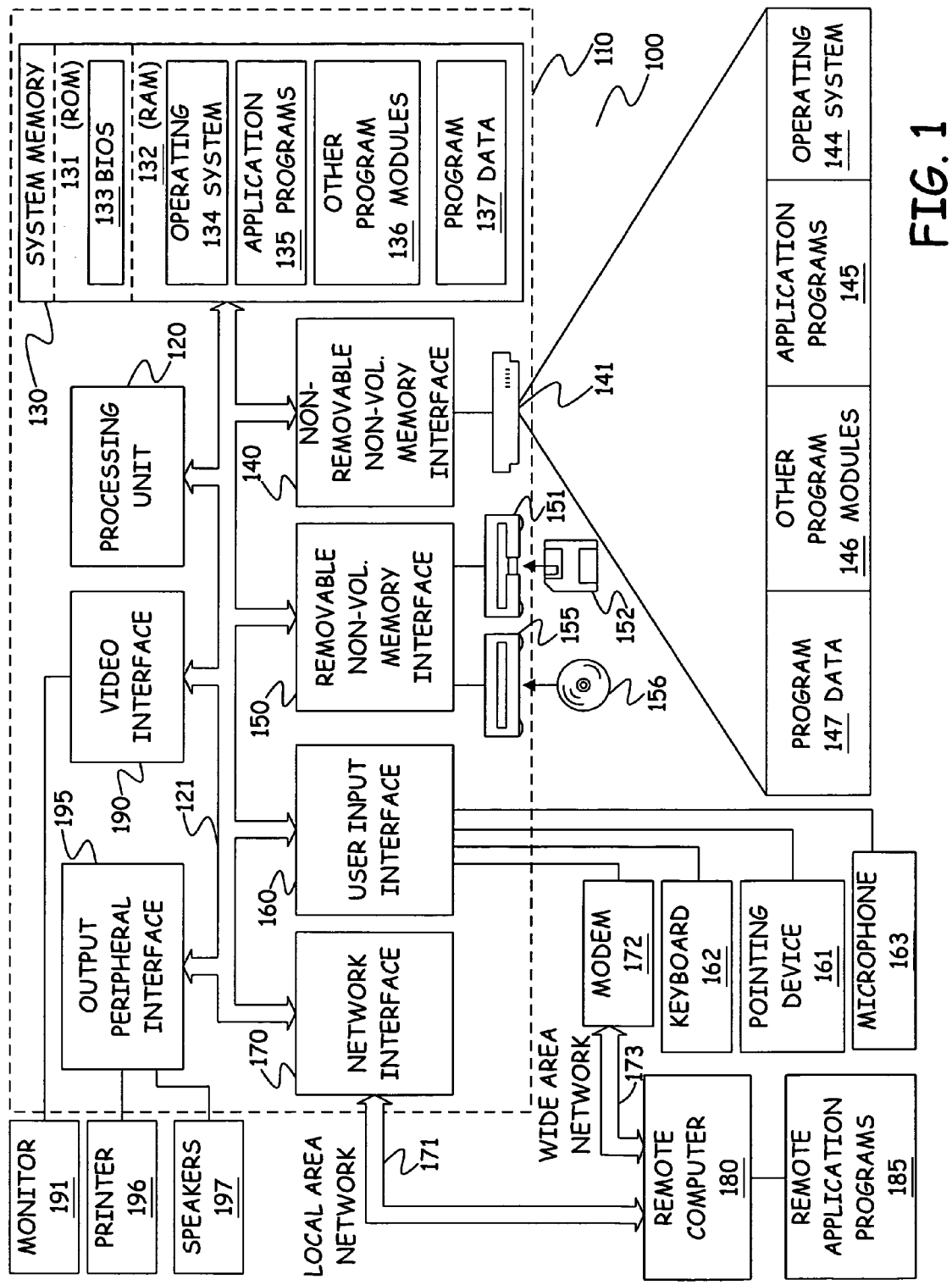
FIG. 1 is a block diagram representation of a general computing environment in which illustrative embodiments of the present invention may be practiced.

FIG. 1 illustrates an example of a suitable computing environment 100 within which embodiments of the present invention and their associated systems may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of illustrated components.

The present invention is operational with numerous other general purpose or special purpose computing consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

II. Automatic Grammar Generation Tool

As described above, speech recognition applications often need to deal with big lists of items, including proper names, symbols, numbers, and ids. It is a significant challenge to generate efficient grammars for use in speech recognition, in a correct and timely manner, from those big lists. The present invention addresses this problem with the development of an advanced algorithm and system for automatically generating such grammars from lists. In some specific embodiments, the present invention automatically analyzes the data set, annotates custom pronunciations, prefixes the grammar, correctly assigns language model weights (CFG phrase branching probabilities), text normalizes names (for the case of spelling grammars), performs Semantic Markup Language (SML) tag optimization, produces the grammars themselves, and raises warnings of potential inconsistencies. In more general embodiments, the present invention performs some, but not all, of these functions as described below.

1. Simulated Recognition Search Tree Generation

The grammar generating tool and method of the present invention drastically reduce the development time, maintenance efforts, and human errors of grammar generation, while at the same time guaranteeing (or at least increasing the likelihood of obtaining) the optimal speech recognition accuracy and system performance. In accordance with embodiments of the present invention, a simulated recognition search tree is generated from a data set of entries (containing a list of items). An optimized grammar is then automatically generated from the simulated recognition search tree. The simulated recognition search tree data structure enables the capture of all information needed to both detect collisions in the dataset and to build the optimal grammar.

In describing the methods, apparatus or systems of the present invention, an example of a simulated recognition search tree will be described with reference to FIGS. 3-1 though 3-4. An example of a grammar produced from the simulated recognition search tree will be described with reference to FIG. 4. In these FIGS. and the related discussions, the dataset {'Michael Anderson' (Michael Anderson), 'Michael Smith' (Dr. Smith), 'Michael' (Michael), 'David Ollason' (David Ollason)} is used as an example. The phrases in the single quotation marks (e.g., 'Michael Smith') represent speech recognition matches, while the phrases in the parenthesis (e.g., (Dr. Smith)) mark the SML values to be returned in response to a match.

Figure 2:
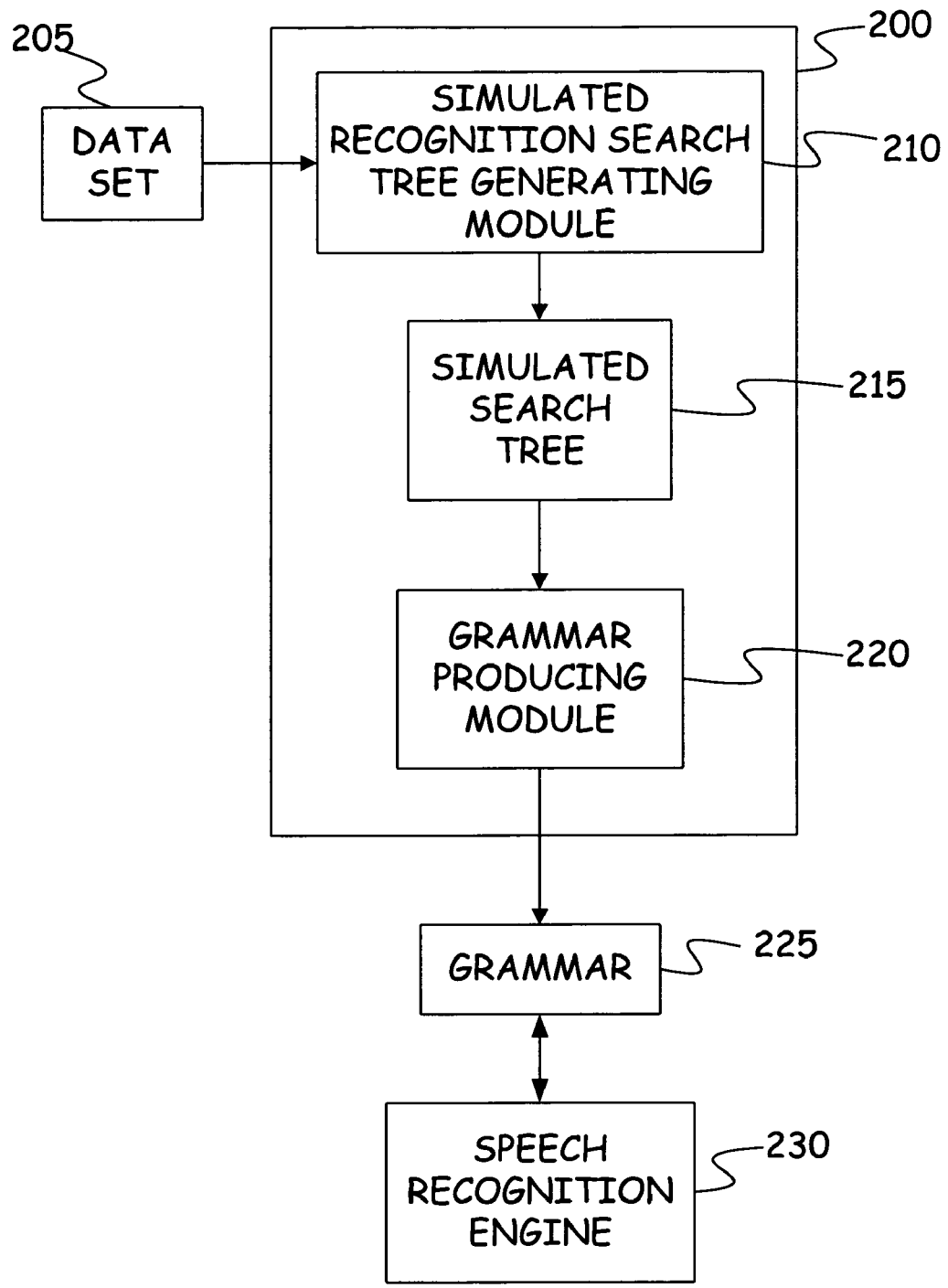
FIG. 2 is a block diagram illustrating a grammar generation system or tool using simulated recognition search trees in accordance with embodiments of the present invention.

Shown in FIG. 2 is a block diagram of an automatic grammar generation system 200 in accordance with some embodiments of the present invention. Grammar generation system 200 includes a simulated recognition search tree generating component or module 210 and a grammar producing component or module 220. Search tree generating module 210 uses a data set 205 (or list of names or other entries) to generate a simulated search tree 215. Grammar producing module 220 then uses simulated search tree 215 to generate grammar 225, which can be a CFG of the type used by a speech recognition engine 230 during speech recognition processes.

Figures 1, 3:
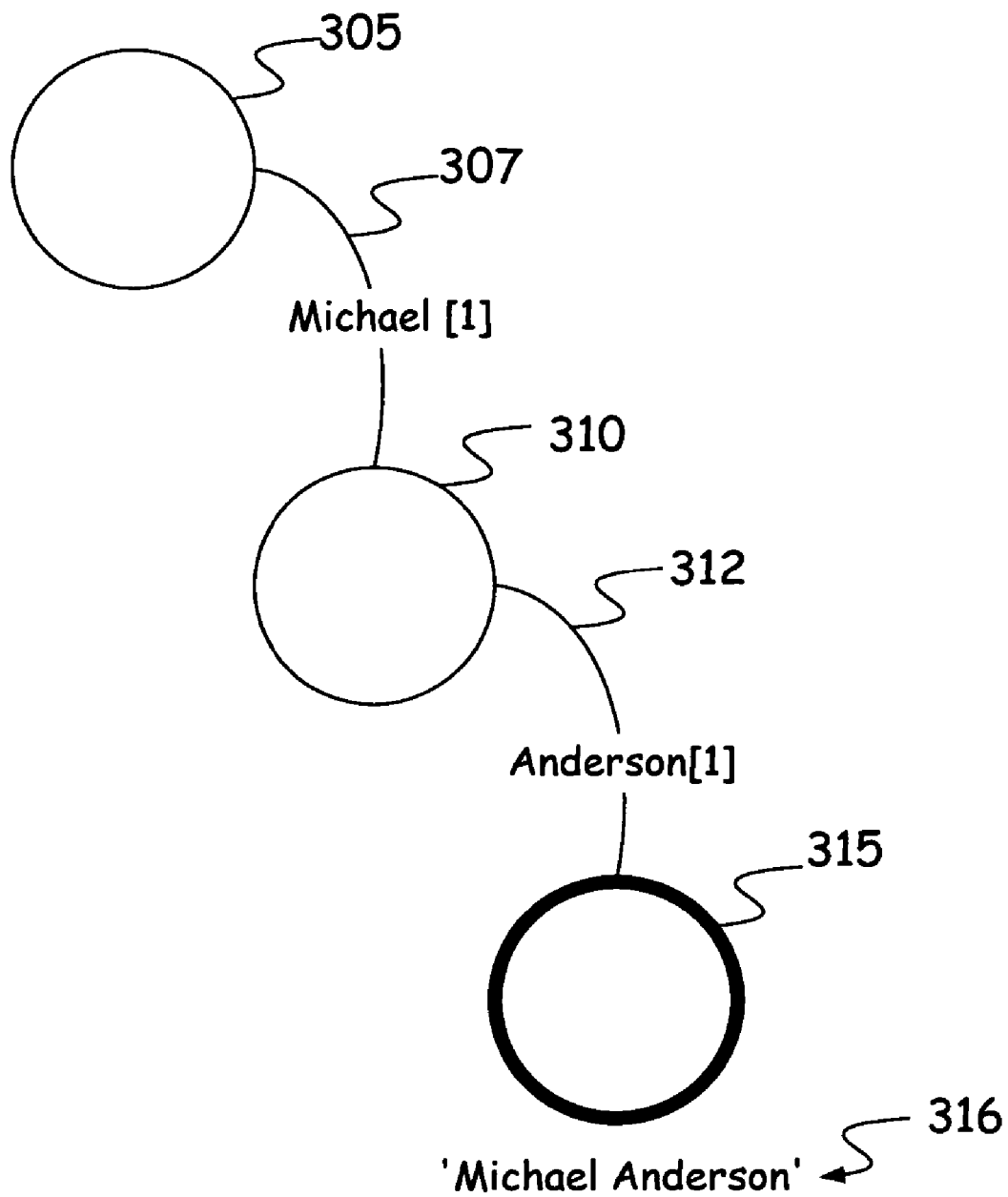
Figures 2, 3:
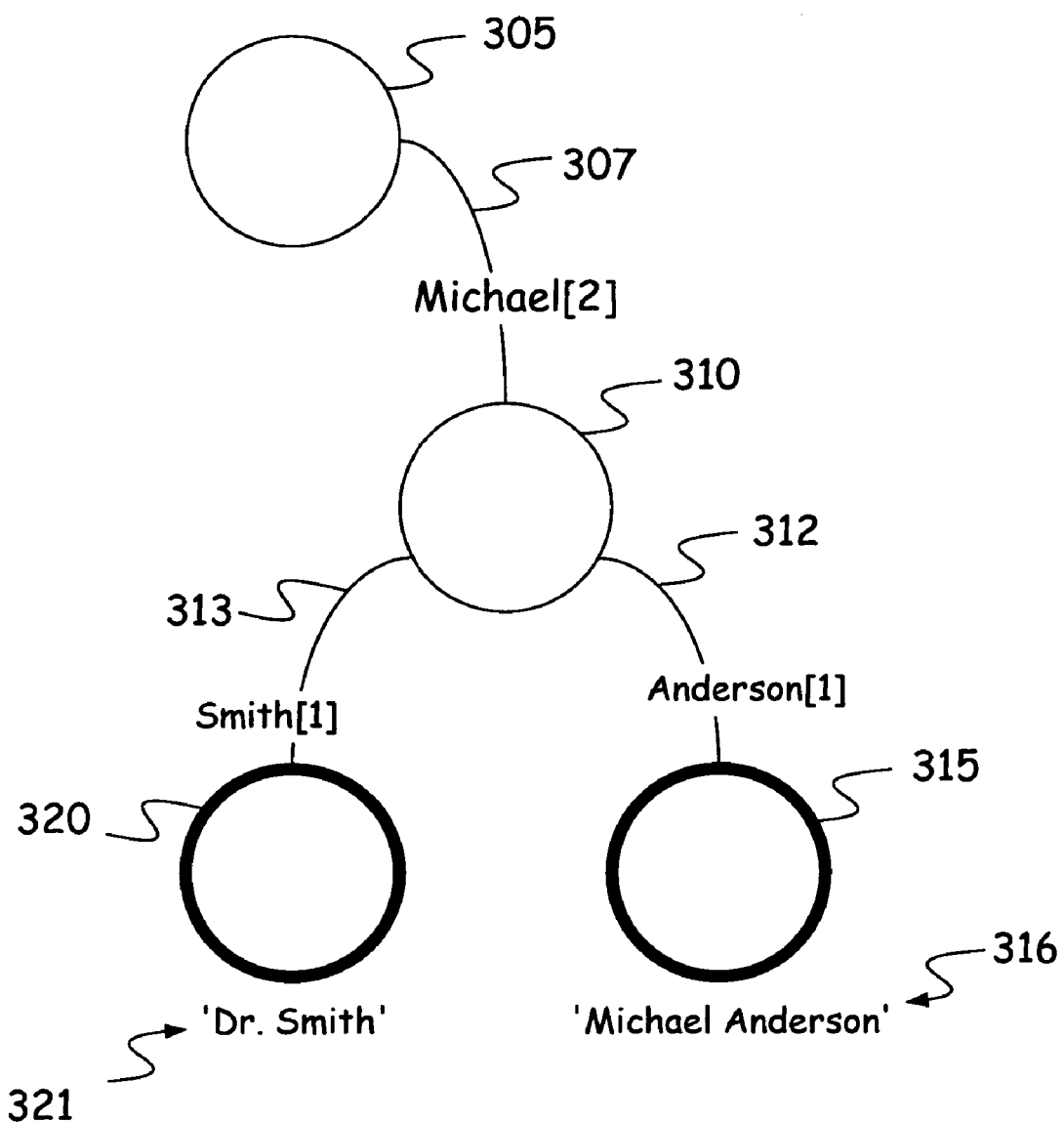
Figure 3:
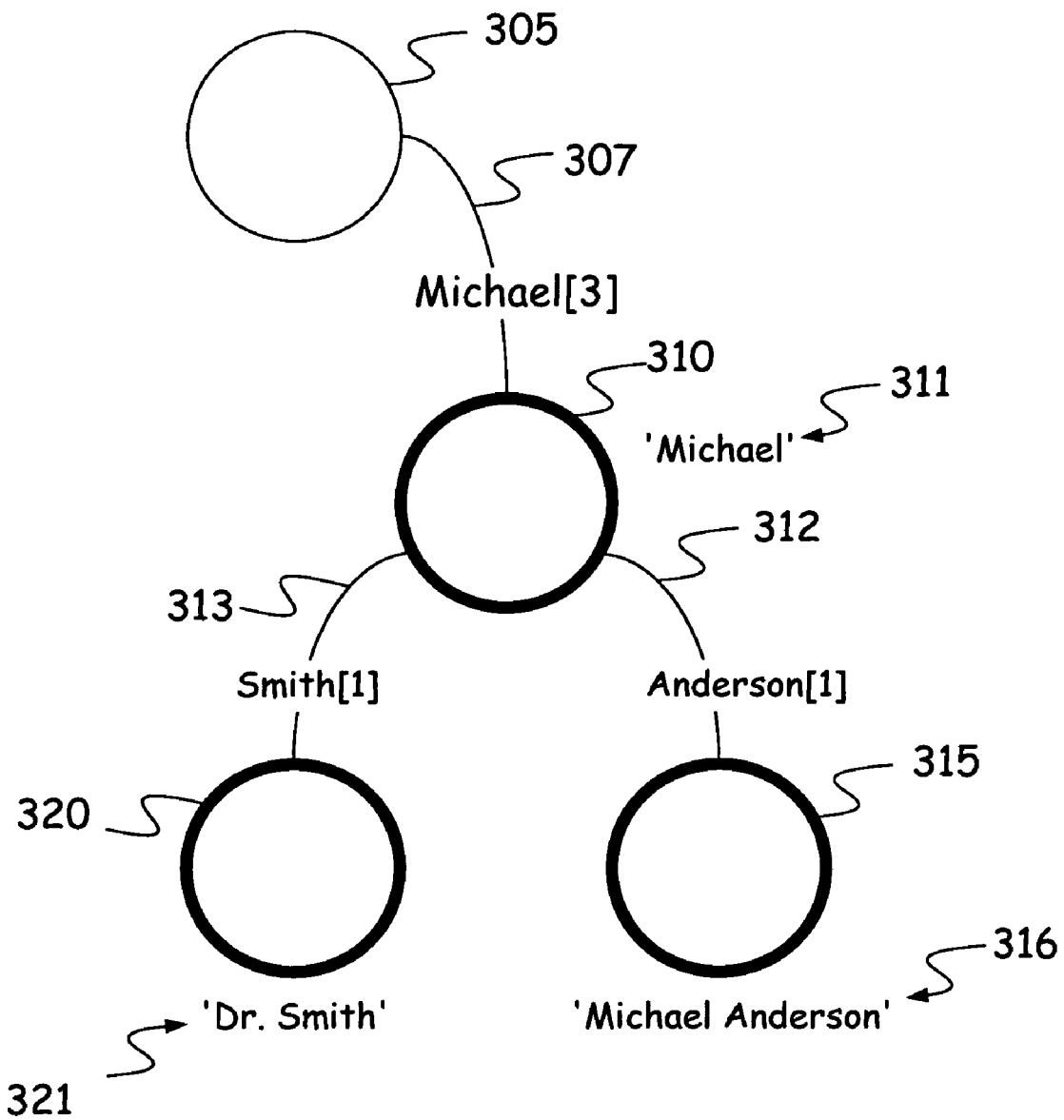
Figures 3, 4:
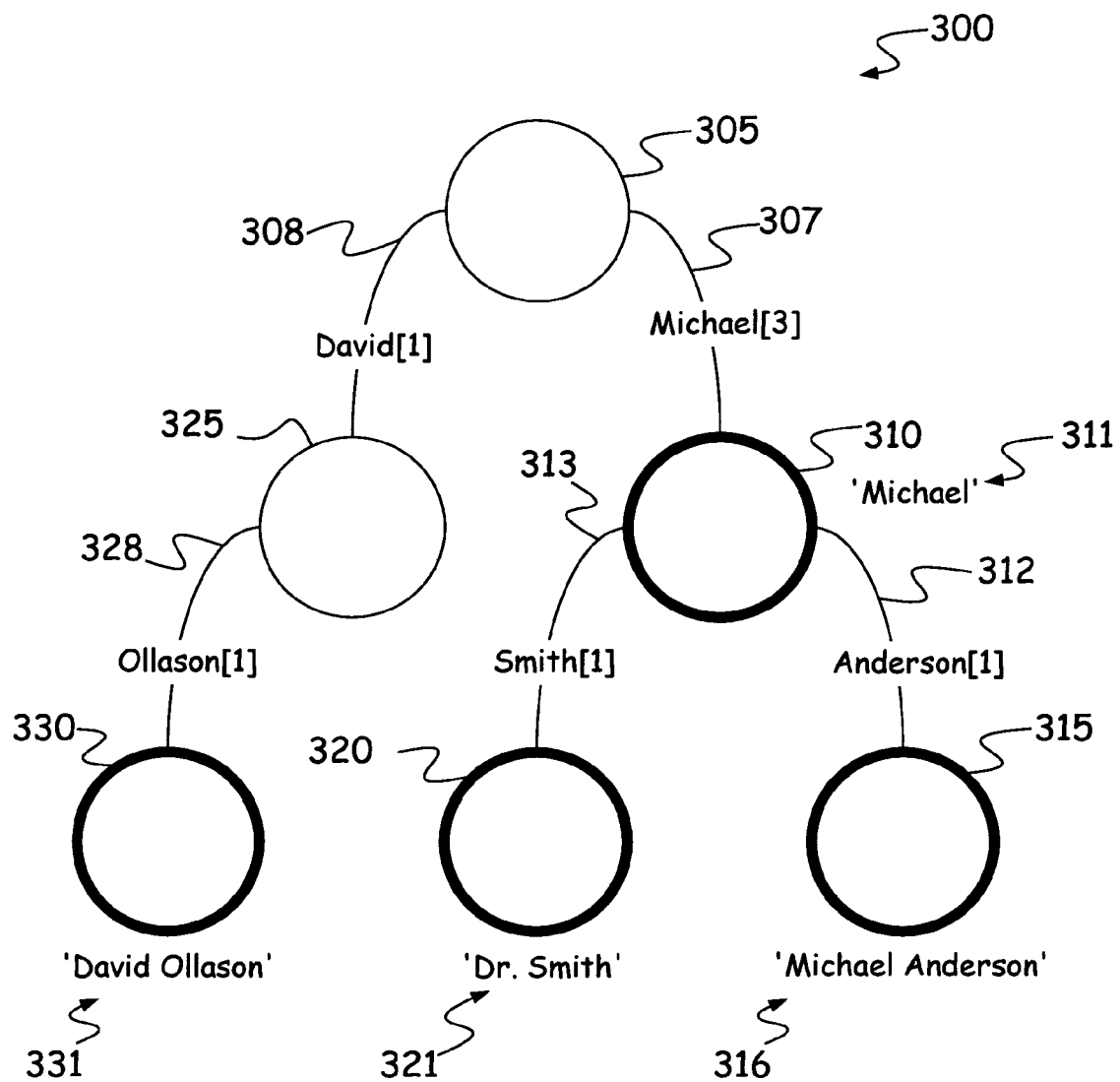

Referring now back to FIGS. 3-1 through 3-4, shown are diagrammatic representations of the generation of a simulated recognition search tree 300, which is shown in its final form in FIG. 3-4. Simulated search tree 300 is built for the example data set listed above. For discussion purposes, the search tree is generated sequentially in the order that the data set was listed: {'Michael Anderson' (Michael Anderson), 'Michael Smith' (Dr. Smith), 'Michael' (Michael), 'David Ollason' (David Ollason)}. The arcs or paths of this tree structure represents words which can be recognized. Each arc is labeled with the word to be recognized and a weight which, in most of the cases, is the count of the phrases in the data set 205 which share that word. A node in the tree is called a terminal node (shown with a thicker border) if the phrase reaching this node is a complete "sentence" (i.e., expression, name, etc) to be accepted. Each terminal node holds a collection of the SMLs to be returned for that terminal node.

Referring first more specifically to FIG. 3-1, the simulated search tree is initiated for the data entry or name, "Michael Anderson". From the root node 305, this results in an arc 307 to node 310 corresponding to "Michael". Arc 307 is labeled with the word to be recognized (i.e., "Michael") and a phrase count or other weight designator to be assigned to that arc in the tree. In this case, the phrase count is "1" since this is the first occurrence of the word "Michael". From node 310, the entry "Michael Anderson" also results in arc 312 to terminal node 315. Arc 312 is labeled with the word to be recognized (i.e., "Anderson") and the phrase count for that word. The SML value 316 to be returned, in this case 'Michael Anderson', is stored in association with terminal node 315.

Referring next to FIG. 3-2, generation of the simulated search tree is continued for the data entry or name, "Michael Smith". Since this is the second occurrence of the word "Michael", the phrase count associated with arc 307 is updated to "2". From node 310, the entry "Michael Smith" also results in arc 313 to terminal node 320. Arc 313 is labeled with the word to be recognized (i.e., "Smith") and the phrase count for that word, which is "1" since this is the first occurrence of the word "Smith". The SML value 321 to be returned, in this case 'Dr. Smith', is stored in association with terminal node 320.

Referring next to FIG. 3-3, generation of the simulated search tree is continued for the data entry or name, "Michael". Since this is the third occurrence of the word "Michael", the phrase count associated with arc 307 is updated to "3". Also, since "Michael" is now a complete sentence (i.e., phrase or expression) to be accepted, node 310 becomes a terminal node. An SML value 311 to be returned, in this case 'Michael', is therefore stored in association with terminal node 310.

Referring finally to FIG. 3-4, the simulated search tree is completed after its expansion for the data entry or name, "David Ollason". From the root node 305, this results in an arc 308 to node 325 corresponding to "David". Arc 308 is labeled with the word to be recognized (i.e., "David") and a phrase count to be assigned to that arc in the tree. In this case, the phrase count is "1" since this is the first occurrence of the word "David" in tree 300. From node 325, the entry "David Ollason" also results in arc 328 to terminal node 330. Arc 328 is labeled with the word to be recognized (i.e., "Ollason") and the phrase count for that word. The SML value 331 to be returned, in this case 'David Ollason', is stored in association with terminal node 330.

Using simulated recognition search tree 300, a grammar can be automatically generated. An example of such a grammar is provided in FIG. 4. With each terminal node holding a collection of SMLs to be returned, various information can be readily ascertained from search tree 300:

a) Collision Detection: Collision occurs when two exact input sentences reach the same terminal node with different SMLs to return. Using search tree 300, collisions can be easily identified by checking the size of the SML collection at every terminal node.

b) CFG Weight Calculation: To properly maintain the weights for every branch of the search tree 300, it is only necessary to increment the count every time an arc is re-visited (phrase is shared).

c) Grammar generation: With the weight information available, an optimal (prefixed) grammar can be readily produced directly from traversing the search tree 300.

d) SML tag optimization: Statistics show that the space (memory) taken up by SML tags can reach 50% of the size of the CFG. In order to reduce the size (memory needed to load the CFG), the present invention includes a mechanism to explicitly store the SML tag in the CFG as often as possible. Since the speech application program interface (SAPI) returns the recognized phrase text (e.g., "Michael Anderson") automatically with no extra CFG memory required, in accordance with the present invention the SML label is only stored if it can not be derived from the recognized text. A wrapper is implemented to check whether the SML was explicitly reported. If not, the empty SML label is replaced with the recognized text. An example of such a wrapper is shown in the grammar of FIG. 4, and is repeated here for discussion purposes.

```
<tag>if (   $._attributes == undefined)
    {       $._attributes = {};
            $._value = $recognized.text; };
            $._attributes.text = $recognized.text;
</tag>
```

As an example, only the terminal node 321 in FIG. 3-4 needs an SML tag portion. Here, the SML tag portion "($._attributes==undefined)" represents that the semantic tag is missing, and the SML tag portion "$._value=$recognized.text;" and "$._attributes.text=$recognized.text" dictate that the recognized text should be returned in place of the empty SML label. For a large data set, this saves a significant amount of space, resulting also in a faster speech recognition turn-around time.

2. Additional Features

Figure 5:
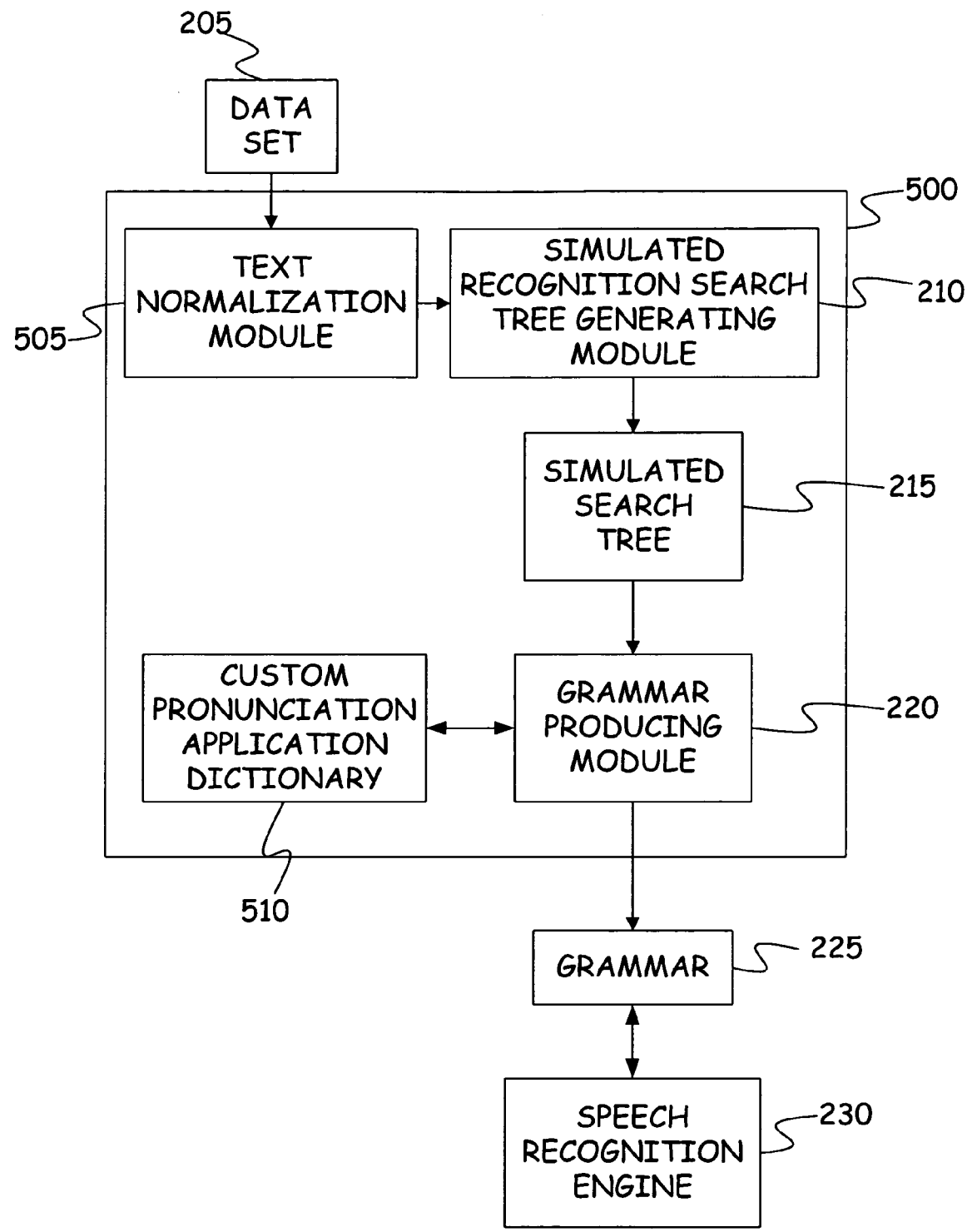
FIG. 5 is a block diagram illustrating a grammar generating system of the type shown in FIG. 2, but including additional optional features.

Using the simulated recognition search tree methods of grammar generation described above, other features can be added to facilitate the grammar generation process. These features are illustrated in the block diagram of an automatic grammar generation system 500 shown in FIG. 5. System 500 includes the same components or modules as shown in FIG. 2, and includes components or modules 505 and 510 in accordance with some further example embodiments of the present invention. Features added with these modules include:

a) Custom pronunciation annotation: An optional Application Dictionary interface 510 can be added to the grammar generation to override the default pronunciations used by the speech recognition engine 230. For every word the system 500 (via module 220) writes into the CFG 225, it is checked to see if it is in that dictionary 510. If it is in dictionary 510, then a SAPI <pron> (pronunciation) tag is added to the SML to annotate the pronunciation. To change the pronunciations, it isn't necessary to modify the CFG. Instead, the application dictionary can be updated and the CFG re-generated.

b) Text normalization for the spelling grammars: It has been discovered that many requirements/features of spelling grammars can be supported by the additional text normalization step provided by text normalization component or module 505. Since all phrases that can be recognized are captured in the tree 300, the text normalization step adds (additional) phrases which can also be recognized to support the flexible spelling. For example, these can include:

i. Letters extraction: When a word like "Ollason" is encountered, letters "O. L. L. A. S. O. N." can be individually added as the actual phrase to the tree. In other words, each letter forms an arc in a path toward a terminal node representing the phrase including all of the individual letters of that name.

ii. Letters grouping: When a valid letter grouping is detected in the phrase, additional phrases can be added to the tree accordingly. For example, in some cases, if "letter grouping" is turned on, then both "O. L. L. A. S. O. N" and "O. double L. A. S. O. N" are added to the tree to accommodate the manner in which different speakers might sound out the spelling of "Ollason."

iii. Optional Punctuations: if punctuations are optional, additional phrases with the punctuations removed can also be added to the tree. For example, if hyphens are optional, then one can add "A. dash B. C." and "A. B. C." when "A-BC" is encountered.

Although the present invention has been described with reference to particular embodiments, workers skilled in the art will recognize that changes may be made in form and detail without departing from the spirit and scope of the invention

What is claimed is:

1. A computer-implemented method of generating a speech recognition grammar, the method comprising:
    using a processor to automatically generate a simulated recognition search tree representing items in a data set, wherein the simulated recognition search tree representing items in the data set comprises nodes and arcs between nodes, each arc representing a word from the data set which can be recognized, and wherein generating the simulated recognition search tree comprises:
        using the processor to build the simulated recognition search tree such that each word to be recognized in the data set is represented by an arc between nodes in the simulated recognition search tree by labeling each arc with its corresponding word to be recognized and by also labeling each arc with a weight which comprises a count of the phrases in the data set which share the word corresponding to the arc and which are represented by a path in the arc;
        using the processor to determine whether a phrase belonging to the data set is a complete expression to be accepted by a node in the simulated recognition search tree; and
        using the processor to identify the node corresponding to the complete expression as a terminal node of the automatically generated simulated recognition search tree if the phrase is determined to be a complete expression;
    using the processor to store, for each terminal node of the automatically generated simulated recognition search tree, semantic markup language (SML), to be returned by a speech recognition engine in response to the complete expression, in association with the terminal node of the automatically generated simulated recognition search tree;
    using the processor to identify terminal nodes of the automatically generated simulated recognition search tree with two complete expressions which reach the terminal node, but with different SML to return, as being indicative of collisions;
    using the processor to automatically generate the speech recognition grammar using the simulated recognition search tree; and
    using the processor to store the speech recognition grammar on a computer storage medium for use in speech recognition.

2. The method of claim 1, wherein using the processor to automatically generate the simulated recognition search tree representing items in the data set comprises automatically generating a tree data structure representing items in the data set.

3. The method of claim 2, wherein automatically generating the tree data structure representing items in the data set further comprises automatically generating the tree data structure representing names in a list of names.

4. The method of claim 1, wherein using the processor to automatically generate the speech recognition grammar using the simulated recognition search tree further comprises automatically generating the speech recognition grammar with the weights that label the arcs of the simulated recognition search tree.

5. A computer storage medium having stored thereon computer-executable instructions for implementing speech recognition context free grammar generating steps comprising:
    automatically generating a simulated recognition search tree from a data set, including building the simulated recognition search tree such that each word to be recognized in the data set is represented by an arc between nodes in the simulated recognition search tree and a weight of the word to be recognized, building the simulated recognition search tree further comprising labeling each arc with its corresponding word to be recognized and labeling each arc with the weight of the word to be recognized, wherein the weight comprises a count of the phrases in the data set which share the word corresponding to the arc and which are represented by a path including the arc;
    generating the speech recognition context free grammar using the tree; and
    storing the speech recognition context free grammar on a computer storage medium for use in speech recognition.

6. The computer storage medium of claim 5, wherein automatically generating the simulated recognition search tree comprises automatically generating a tree data structure representing items in the data set.

7. The computer storage medium of claim 6, wherein automatically generating the tree data structure representing items in the data set further comprises automatically generating the tree data structure representing names in a list of names.

8. The computer storage medium of claim 5, wherein generating the speech recognition context free grammar using the tree further comprises generating the speech recognition context free grammar with the weights that label the arcs of the simulated recognition search tree.

9. The computer storage medium of claim 5, wherein building the simulated recognition search tree further comprises:
    determining whether a phrase reaching a node is a complete expression to be accepted; and
    identifying nodes corresponding to complete expressions to be accepted as terminal nodes.

10. The computer storage medium of claim 9, and for each terminal node further comprising storing semantic markup language (SML), to be returned by a speech recognition engine in response to the complete expression, in association with the terminal node.

11. The computer storage medium of claim 10, wherein generating the speech recognition context free grammar further comprises identifying terminal nodes with two complete expressions which reach the terminal node, but with different SML to return, as being indicative of collisions.

12. A grammar generation system, embodied in a computer, for generating a speech recognition context free grammar for use by a speech recognition engine, the system comprising:
    a processing unit and computer storage medium, the computer storage medium having stored thereon computer-executable instructions which configure the processing unit to implement grammar generation system components comprising:
        a search tree module configured to automatically generate a simulated recognition search tree representing items in a data set, including building the simulated recognition search tree such that each word to be recognized in the data set is represented by an arc between nodes in the simulated recognition search tree and a weight of the word to be recognized which is a count of phrases in the data set which share the word corresponding to the arc and which are represented by a path including the arc; and
a grammar producing module configured to generate the speech recognition context free grammar using the generated simulated recognition search tree and to provide the speech recognition context free grammar as an output for use by a speech recognition engine in performing speech recognition.

13. The grammar generation system of claim 12, wherein the search tree module is configured to generate the simulated recognition search tree such that it represents names in a list of names comprising the data set.

14. The grammar generation system of claim 12, wherein the search tree module is configured to generate the simulated recognition search tree from the data set by labeling each arc with its corresponding word to be recognized.

15. The grammar generation system of claim 12, wherein the search tree module is further configured to build the simulated recognition search tree by:
   determining whether a phrase reaching a node is a complete expression to be accepted; and
   identifying nodes corresponding to complete expressions to be accepted as terminal nodes.

16. The grammar generation system of claim 15, wherein the search tree module is further configured to build the simulated recognition search tree by storing semantic markup language (SML), to be returned by a speech recognition engine in response to the complete expression, in association with the terminal node.

* * * * *